US009994327B1

(12) United States Patent
Zheng et al.

(10) Patent No.: US 9,994,327 B1
(45) Date of Patent: Jun. 12, 2018

(54) AIRCRAFT NACELLE ANTI-ICE SYSTEMS AND METHODS

(71) Applicant: United Technologies Corporation, Farmington, CT (US)

(72) Inventors: Zhijun Zheng, Avon, CT (US); James H Anderson, Vernon, CT (US); Scott David Sanicki, East Hampton, CT (US)

(73) Assignee: United Technologies Corporation, Farmington, CT (US)

( * ) Notice: Subject to any disclaimer, the term of this patent is extended or adjusted under 35 U.S.C. 154(b) by 0 days. days.

(21) Appl. No.: 15/377,287

(22) Filed: Dec. 13, 2016

(51) Int. Cl.
  *B64D 15/20* (2006.01)
  *B64D 15/02* (2006.01)
  *B64D 29/00* (2006.01)
  *B64D 33/02* (2006.01)

(52) U.S. Cl.
  CPC ............ *B64D 15/20* (2013.01); *B64D 15/02* (2013.01); *B64D 29/00* (2013.01); *B64D 2033/0233* (2013.01)

(58) Field of Classification Search
  CPC ........ B64D 15/20; B64D 15/04; B64D 15/18; B64D 15/14; H05K 7/20209; F02C 6/08; A23L 3/36
  See application file for complete search history.

(56) References Cited

U.S. PATENT DOCUMENTS

| 4,738,416 A * | 4/1988 | Birbragher ............. B64D 15/04 244/134 B |
| 4,852,343 A | 8/1989 | Norris et al. |
| 5,011,098 A * | 4/1991 | McLaren ............... B64D 15/04 244/134 B |
| 6,216,469 B1 * | 4/2001 | Miller ........................ A23L 3/36 165/171 |
| 9,194,300 B2 * | 11/2015 | Sebaa ........................ F02C 6/08 |
| 2008/0142638 A1 | 6/2008 | Chapman et al. |
| 2010/0199629 A1 | 8/2010 | Chene et al. |
| 2011/0297789 A1 * | 12/2011 | Gallman ............... B64D 15/14 244/134 R |
| 2012/0291996 A1 * | 11/2012 | Nilsson .............. H05K 7/20209 165/104.11 |
| 2015/0108233 A1 | 4/2015 | Wright |
| 2015/0260501 A1 * | 9/2015 | Go .......................... B64D 15/20 324/671 |
| 2017/0081032 A1 | 3/2017 | Botura et al. |

FOREIGN PATENT DOCUMENTS

| CN | 102490905 A * | 6/2012 | ............. B64D 15/18 |
| EP | 3034813 | 6/2016 | |

OTHER PUBLICATIONS

Extended European Search Report dated Mar. 26, 2018 in European Application No. 17207136.7.

* cited by examiner

*Primary Examiner* — Yuri Kan
(74) *Attorney, Agent, or Firm* — Snell & Wilmer L.L.P.

(57) ABSTRACT

A method for anti-ice performance analysis may comprise cycling a flow of heating air through an aircraft structure, measuring a temperature of the aircraft structure to generating an oscillatory signal, measuring a minimum temperature value of the oscillatory signal, and calculating anti-ice conditions of the aircraft structure based on the minimum temperature value.

18 Claims, 6 Drawing Sheets

AIRCRAFT NACELLE ANTI-ICE SYSTEMS AND METHODS

FIELD

The present disclosure relates to anti-ice systems for aircrafts structures, and, more specifically, to anti-ice analysis, systems, and methods.

BACKGROUND

Nacelles for gas turbine engines are known, and typically include an inlet section, a fan section, and a thrust reverser section. The inlet section may deliver air into a compressor of the gas turbine engine, and also deliver air outwardly of the compressor as bypass air to the fan section. The air is compressed in the compressor and delivered downstream into a combustion section where it is mixed with fuel and ignited. Products of this combustion pass downstream to a turbine and over turbine rotors, driving the turbine rotors to rotate. The turbine rotors in turn rotate the compressors and fan.

Under various conditions, ice may form on the nacelle. The nacelle may include an anti-ice system to prevent this ice formation. Anti-ice systems may undergo certification processes to ensure adequate performance.

SUMMARY

A method for anti-ice performance analysis is disclosed herein, in accordance with various embodiments. A method for anti-ice performance analysis may comprise cycling a flow of heating air through an aircraft structure, measuring a temperature of the aircraft structure to generating an oscillatory signal, measuring a minimum temperature value of the oscillatory signal, and calculating anti-ice conditions of the aircraft structure based on the minimum temperature value.

In various embodiments, the cycling may comprise repeatedly opening and closing a valve. The method may further comprise determining a first duration for the valve to be open. The method may further comprise determining a second duration for the valve to be closed. The first duration and the second duration may be configured to maintain the temperature of the aircraft structure above a minimum threshold. The first duration and the second duration may be configured to maintain a maximum temperature of the aircraft structure below a maximum threshold. The temperature may be measured at a location corresponding to a coldest location of the aircraft structure. The method may further comprise measuring a second temperature at a location corresponding to a hottest location of the aircraft structure. The minimum temperature value may be used as a constant value signal for calculating a maximum runback ice thickness.

A method for analyzing anti-ice performance of a nacelle inlet is disclosed herein, in accordance with various embodiments. A method for analyzing anti-ice performance of a nacelle inlet may comprise cycling a flow of heating air through a cavity defined by a lip of the nacelle inlet, measuring a temperature of the nacelle inlet to generate an oscillatory signal, measuring a minimum temperature value of the oscillatory signal, and calculating a runback ice thickness of the nacelle inlet using the minimum temperature value.

In various embodiments, the cycling may comprise opening and closing a valve. The oscillatory signal may increase in response to the valve being opened and the oscillatory signal decreases in response to the valve being closed. The method may further comprise determining a first duration for the valve to be open. The method may further comprise determining a second duration for the valve to be closed. The air may be routed around a circumference of the nacelle inlet. The temperature may be measured at a location corresponding to a coldest location of the nacelle inlet. The method may further comprise measuring a second temperature at a location where the flow of heating air first impinges on the nacelle inlet.

An article of manufacture is disclosed herein, in accordance with various embodiments. An article of manufacture may comprise a controller, and a tangible, non-transitory memory configured to communicate with the controller, the tangible, non-transitory memory having instructions stored thereon that, in response to execution by the controller, cause the controller to perform operations, comprising receiving, by the controller, an oscillatory signal comprising temperature values, measuring, by the controller, a minimum temperature value of the oscillatory signal, and calculating, by the controller, anti-ice conditions of an aircraft structure based on the minimum temperature value.

In various embodiments, the instructions may cause the controller to perform operations further comprising determining a first duration for supplying heating air to the aircraft structure. The instructions may cause the controller to perform operations further comprising determining a second duration for supplying heating air to the aircraft structure.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Systems and methods for analyzing anti-ice performance of an aircraft structure are described herein, in accordance with various embodiments. These methods may be performed for anti-ice system certification. A heating air cycle profile may be determined using temperature sensors during certification. During aircraft operation, the temperature sensors may be omitted in place of the predetermined heating air cycle profile.

Anti-ice performance analysis may be cumbersome using temperature profiles which do not comprise a constant value. Thus, systems and methods described herein provide a method for converting an oscillatory signal into a constant value signal for steady state anti-ice performance analysis which may simplify the analysis while also ensuring superior performance of the anti-ice system.

Figure 1:
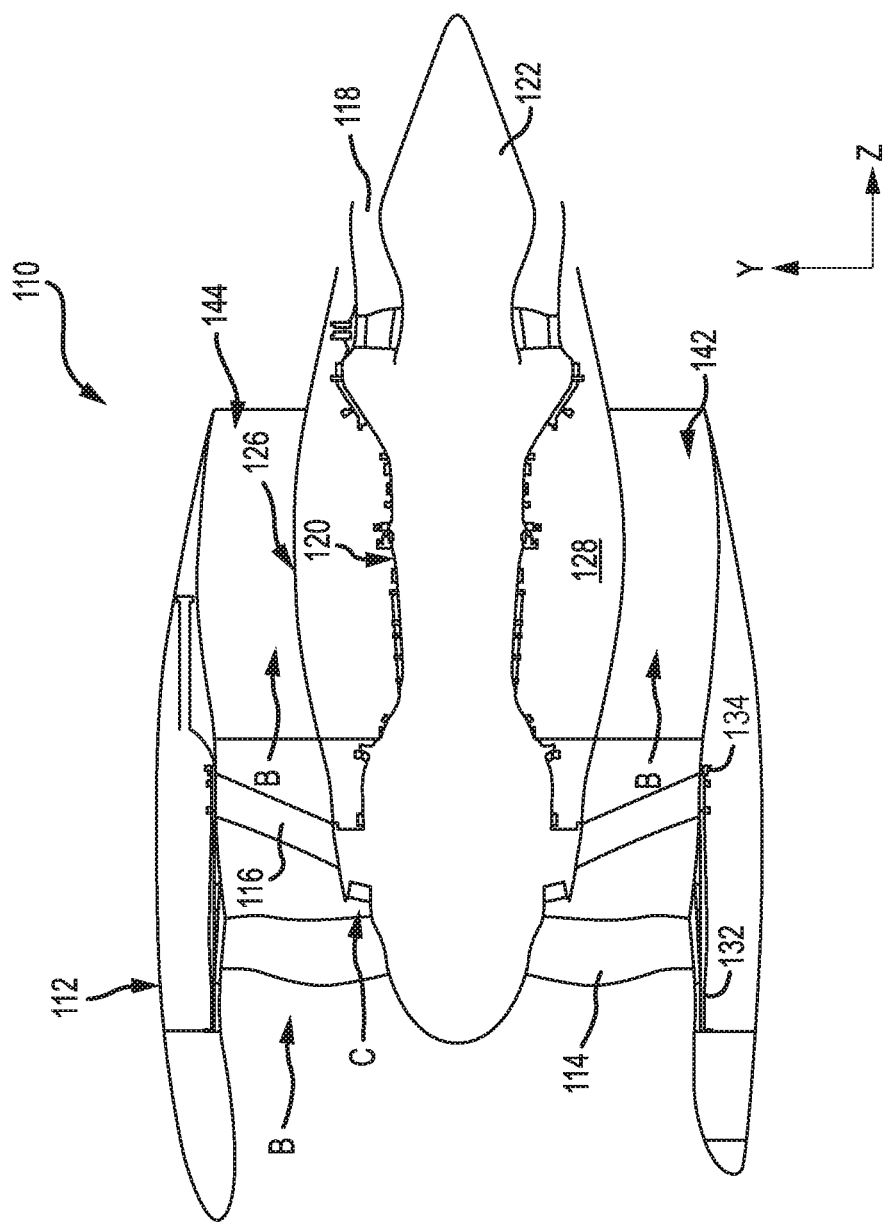
FIG. 1 illustrates a cross-sectional view of an exemplary gas turbine engine, in accordance with various embodiments.

FIG. 1 illustrates a schematic view of a gas turbine engine, in accordance with various embodiments. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within nacelle 112.

Nacelle 112 typically comprises two halves which are typically mounted to a pylon. According to various embodiments, multiple guide vanes 116 may extend radially between core engine 120 and intermediary case (IMC) 134. Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or a compressed air duct, for example. Compressed air ducts may be under high pressure and may supply compressed air from a compressor stage to a nacelle inlet, for example.

Figure 2:
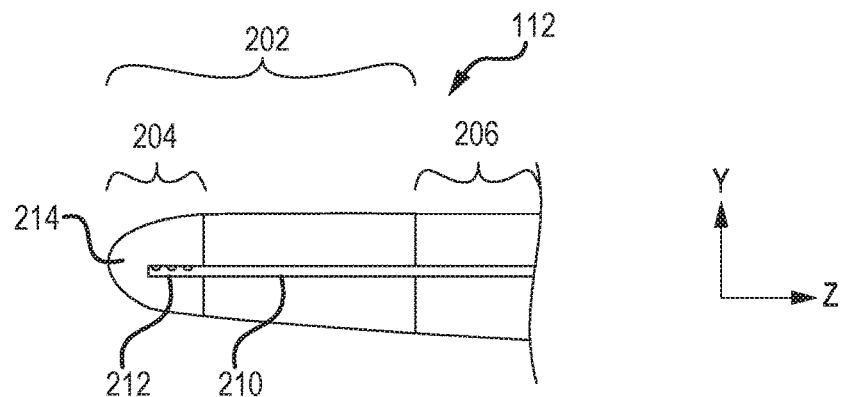
FIG. 2 illustrates a cross-sectional view of a conduit configured to supply a flow of heating air to an inlet section, in accordance with various embodiments.

With respect to FIG. 2, elements with like element numbering as depicted in FIG. 1 are intended to be the same and will not necessarily be repeated for the sake of clarity. With respect to FIG. 3, FIG. 4, and FIG. 5, elements with like element numbering as depicted in FIG. 2 are intended to be the same and will not necessarily be repeated for the sake of clarity.

With reference to FIG. 2, a cross-section view of a portion of nacelle 112 is illustrated, in accordance with various embodiments. Nacelle 112 may comprise an inlet section 202 and a fan section 206. Inlet section 202 may include a lip 204. Lip 204 may comprise a forward extending portion of inlet section 202. A conduit 210 may extend through fan section 206, inlet section 202, and into lip 204. Conduit 210 may comprise a spray manifold 212 having apertures for heating air to exit conduit 210 and enter cavity 214 defined by lip 204.

Figure 3:
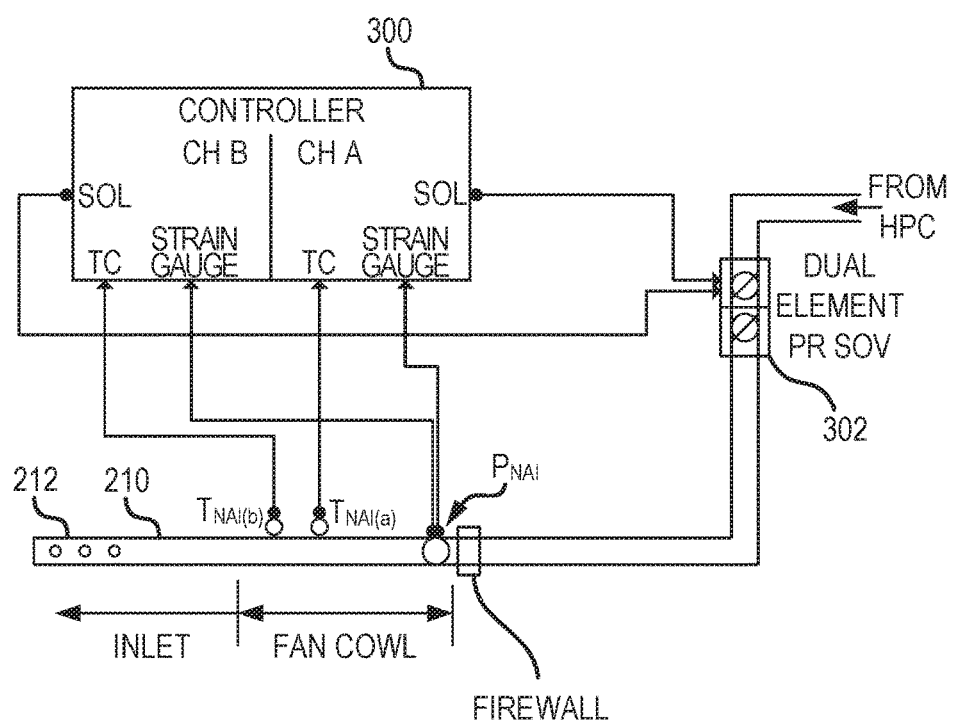
FIG. 3 illustrates a schematic view of a controller in electronic communication with inlet section components and conduit components, in accordance with various embodiments.

With reference to FIG. 3, conduit 210 may be coupled to a high pressure compressor. Conduit 210 may receive heating air from the high pressure compressor. Conduit 210 may extend from the high pressure compressor, through a firewall (i.e., a lower bifurcation firewall), and into fan section 206 and inlet section 202, with momentary reference to FIG. 2. A dual element pressure regulated shut-off valve (SOV) 302 may be connected in-line with conduit 210. Controller 300 may be operatively coupled to SOV 302. A controller may comprise a processor configured to implement various logical operations in response to execution of instructions, for example, instructions stored on a tangible, non-transitory computer-readable medium and/or memory configured to communicate with the controller 300. An article of manufacture may also comprise a tangible, non-transitory computer-readable storage medium having instructions stored thereon to be communicated to a controller. The instructions may cause the controller 300 to perform certain operations, as described herein. Controller 300 may control one or more solenoids which regulate pressure supplied to SOV 302 for opening and closing the SOV 302. In various embodiments, controller 300 may comprise an electronic engine controller (EEC).

Figure 4:
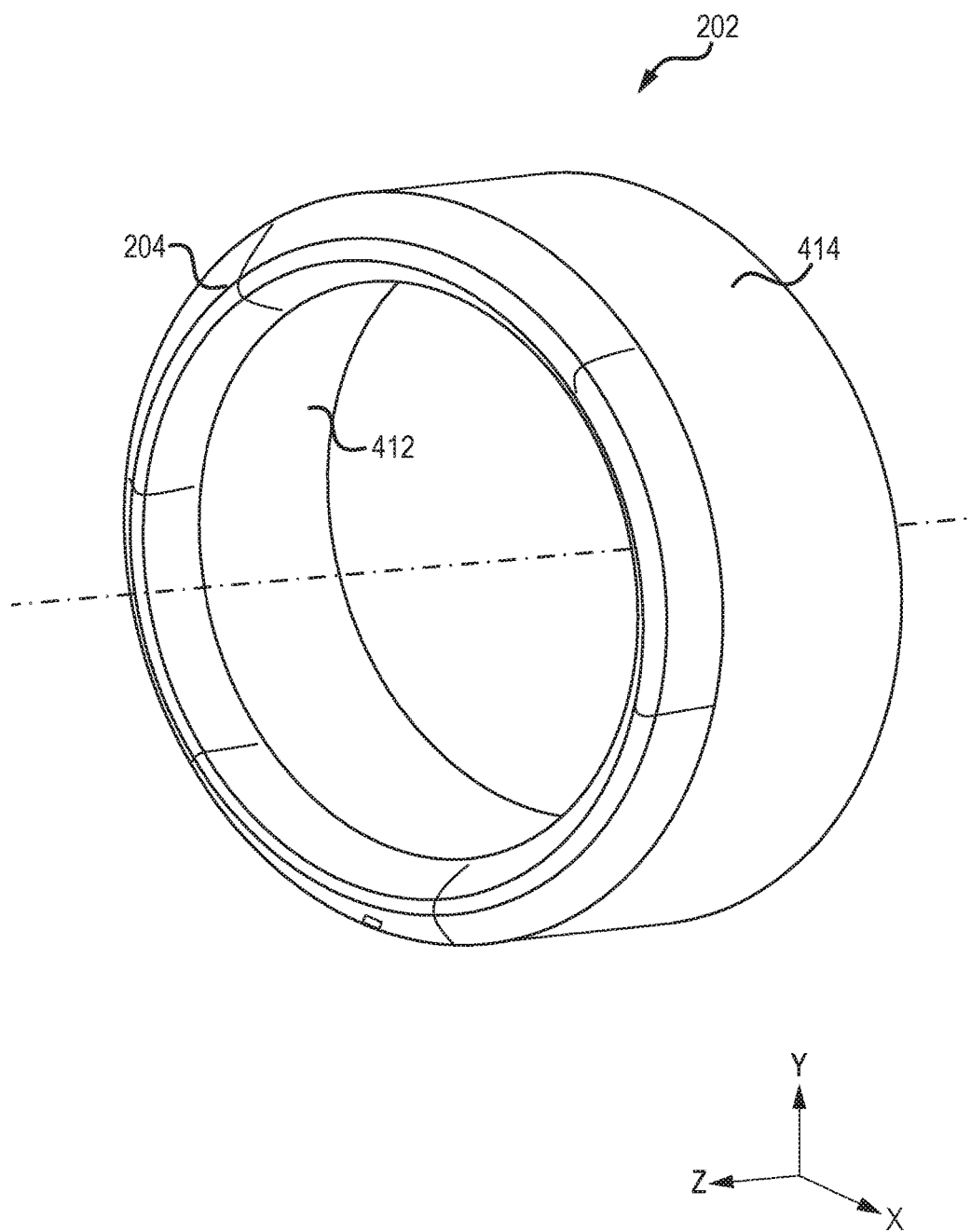
FIG. 4 illustrates a perspective view of a nacelle inlet section, in accordance with various embodiments.

With reference to FIG. 4, a perspective view of the forward side of nacelle inlet section 202 is illustrated, in accordance with various embodiments. Inlet section 202 may comprise lip 204, inner barrel 412, and outer barrel 414. In various embodiments, outer barrel 414 may comprise a first half and a second half.

Figure 5:
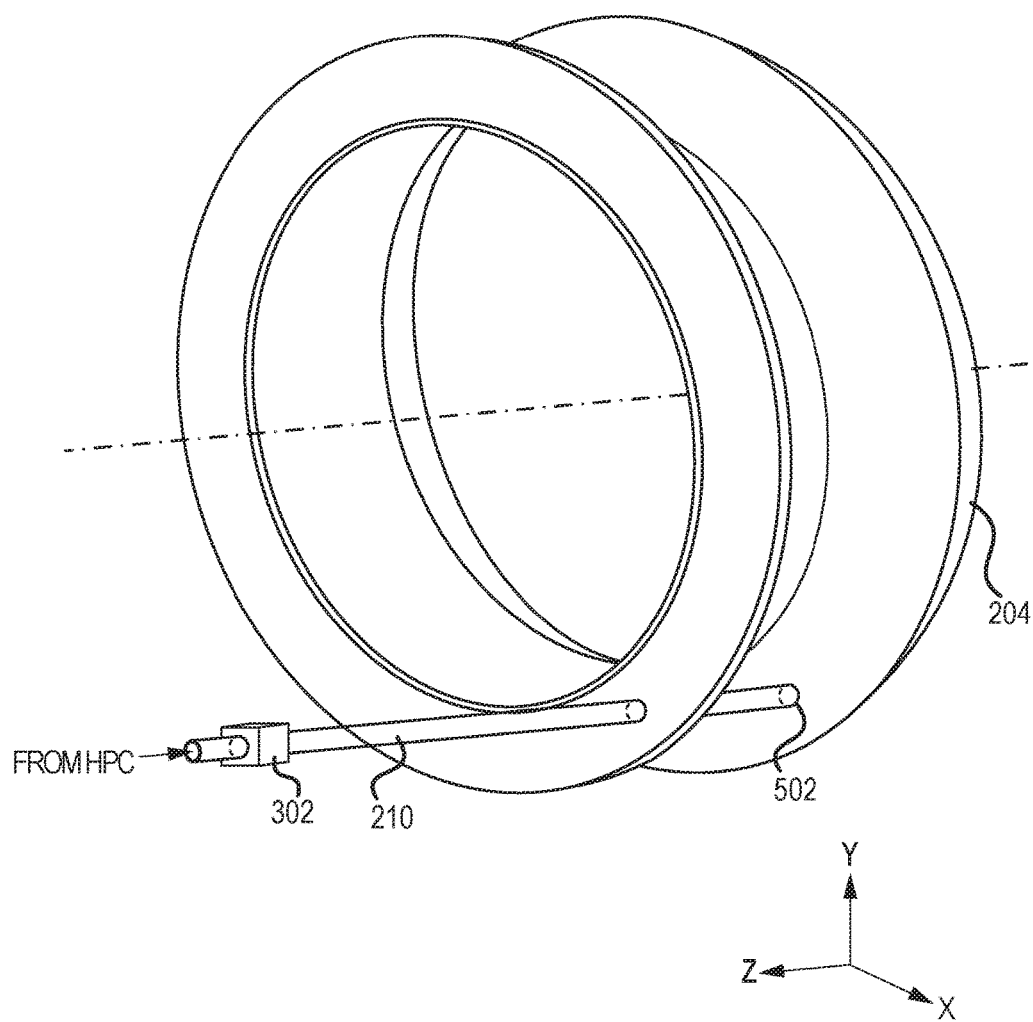
FIG. 5 illustrates a perspective view of the nacelle inlet section with the outer barrel removed, in accordance with various embodiments.

With combined reference to FIG. 5, a perspective view of the aft side of nacelle inlet section 202 with the outer barrel 414 (see FIG. 4) removed is illustrated, in accordance with various embodiments. As illustrated in FIG. 5, conduit 210 may enter lip 204 at location 502.

Figure 6:
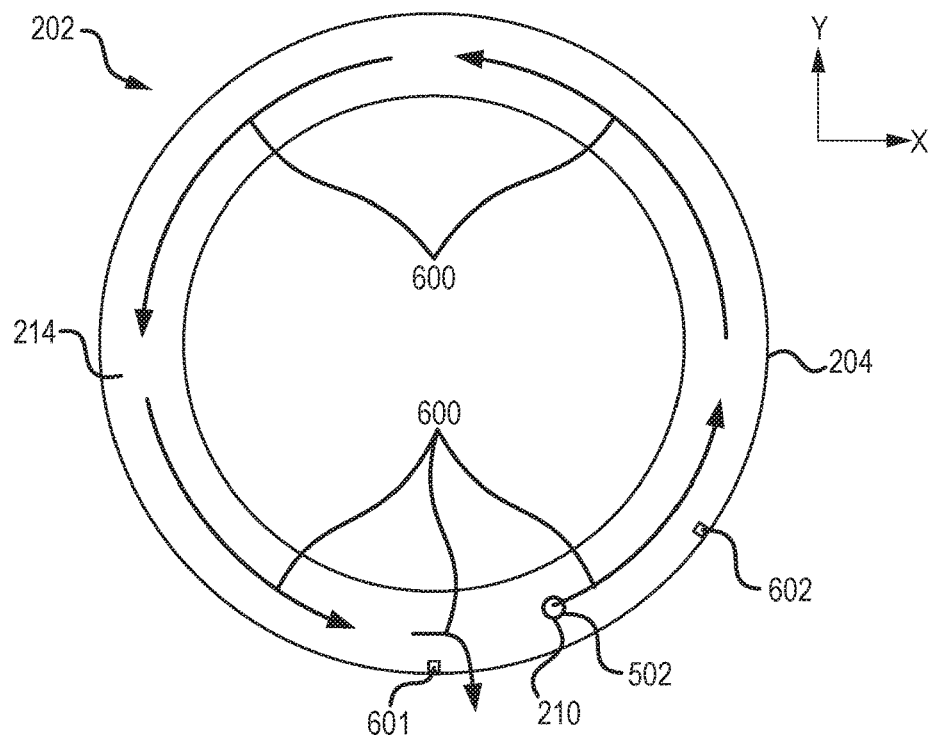
FIG. 6 illustrates a cross-sectional view of a flow of heating air flowing through a lip of a nacelle section, in accordance with various embodiments.
Figure 8:
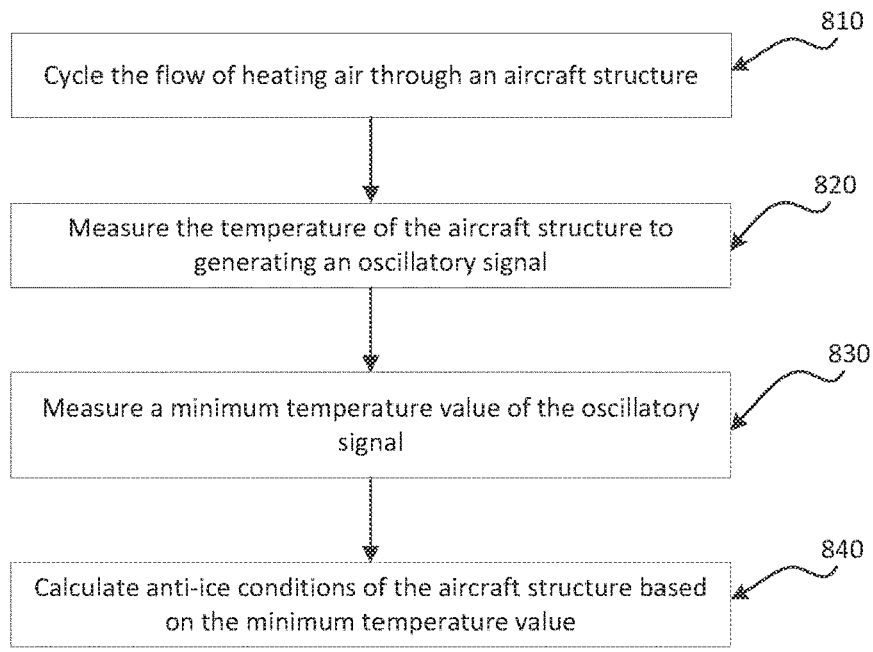
FIG. 8 illustrates a method for analyzing anti-ice performance, in accordance with various embodiments.

With reference to FIG. 6, an aft looking forward cross-section view of inlet section 202 is illustrated, in accordance with various embodiments. Arrows 600 represent the flow of heating air introduced into cavity 214 of lip 204 by conduit 210. Heating air 600 may be routed circumferentially around inlet section 202. With combined reference to FIG. 6 and FIG. 8, a method 800 for anti-ice performance analysis may include coupling one or more temperature sensors, such as first temperature sensor 601 and second temperature sensor 602 to inlet section 202. First temperature sensor 601 may be coupled in close proximity to an exhaust port for the heating air 600. In this manner, first temperature sensor 601 may be configured to measure what may be the coldest location of inlet section 202. For example, it may be expected that inlet section 202 will be the coldest at the exhaust port for heating air 600. Second temperature sensor 602 may be coupled in close proximity to an inlet port for the heating air 600, such as location 502 for example. Second temperature sensor 602 may be disposed at a location where heating air 600 impinges on inlet section 202. In this manner, second temperature sensor 602 may be configured to measure what may be the hottest portion of inlet section 202.

In various embodiments, method 800 may include cycling the flow of heating air through an aircraft structure (step 810). Although it is contemplated that method 800 may be performed in relation to any portion of a vehicle, as illustrated in FIG. 6, step 810 may include cycling the flow of heating air 600 through inlet section 202. The cycling may be performed by repeatedly opening and closing SOV 302, with momentary reference to FIG. 3.

Figure 7:
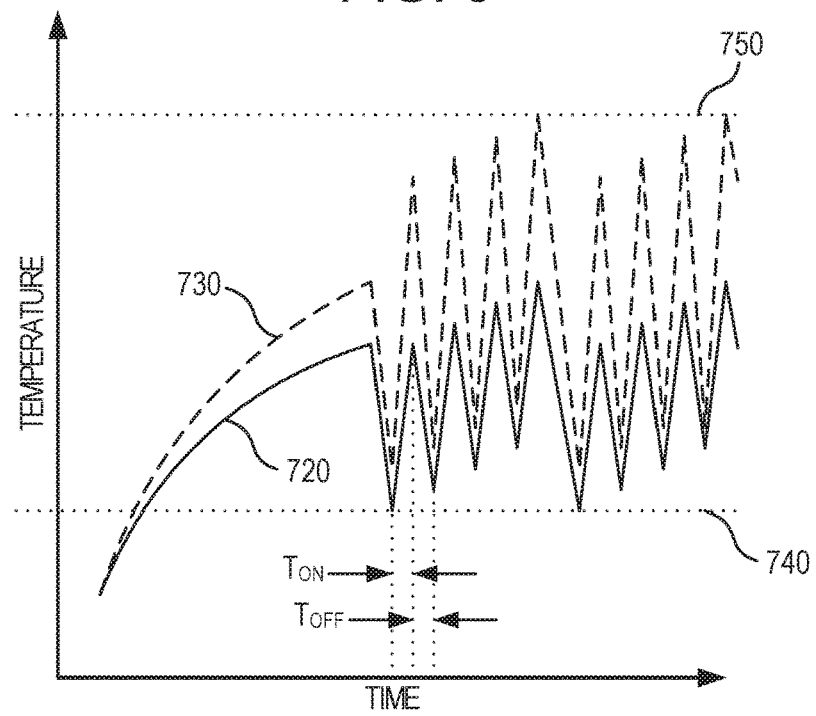
FIG. 7 illustrates a plot of oscillatory signals comprising temperature values versus time, in accordance with various embodiments.

In various embodiments, method 800 may include measuring the temperature of the aircraft structure to generate an oscillatory signal (step 820). With additional reference to FIG. 7, step 820 may include measuring the temperature, via first temperature sensor 601 and/or second temperature sensor 602 to generate one or more oscillatory signals, such as first signal 720 and/or second signal 730. First signal 720 may be generated via first temperature sensor 601. Second signal 730 may be generated via second temperature sensor 602. As shown in FIG. 7, the temperature of inlet section 202 may increase in response to SOV 302 being open and heating air 600 being supplied to inlet section 202 and the temperature of inlet section 202 may decrease in response to SOV 302 being closed and the supply of heating air 600 being cut off to inlet section 202, thus creating an oscillatory signal. In various embodiments, the cycling may be configured to maintain the coldest temperature of inlet section 202 (i.e., the minimum value of first signal 720) above a minimum temperature value 740. In various embodiments, the cycling may be configured to maintain the hottest temperature of inlet section 202 (i.e., the maximum value of second signal 730) below a maximum temperature value 750.

In various embodiments, method 800 may include measuring a minimum temperature value of the oscillatory signal (step 830). Step 830 may include measuring minimum temperature value 740 of first signal 720. In various embodiments, the measuring may be performed by a controller, such as controller 300 for example, with momentary reference to FIG. 3.

In various embodiments, method 800 may include calculating anti-ice conditions of the aircraft structure based on the minimum temperature value (step 840). Step 840 may include using minimum temperature value 740 to determine anti-ice conditions of inlet section 202. For example, it may be assumed that inlet section 202 remains at a constant temperature of the minimum temperature value 740 over a period of time which anti-ice analysis is performed. Using the minimum temperature value as a fixed value may simplify the anti-ice performance analysis. Calculating anti-ice conditions may be performed under wet conditions. Parameters such as liquid water content, droplet size, exposure time, and the minimum temperature value 740 may be used as inputs into a formula to determine maximum runback ice thickness. Then, it may be determine if the minimum temperature value 740 will prevent the maximum runback ice thickness from building up to or above a threshold value. In this regard, step 840 may include calculating, by a controller, the maximum runback ice thickness over lip 204 using minimum temperature value 740 as an input parameter.

In various embodiments, method 800 may include determining a duration for heating air to be supplied to an aircraft structure. Stated differently, method 800 may include determining a first duration $T_{ON}$ for SOV 302, with momentary reference to FIG. 3, to be open to supply heating air 600 to inlet section 202. Method 800 may include determining a duration for heating air to be cut off from an aircraft structure. Stated differently, method 800 may include determining a second duration $T_{OFF}$ for SOV 302, with momentary reference to FIG. 3, to be closed to prevent the supply of heating air 600 to inlet section 202. In this manner, a heating air cycle profile, or cycle mode, may be determined for cycling SOV 302. This cycle mode may be configured to maintain the minimum temperature of inlet section 202 above minimum temperature value 740 and maintain the maximum temperature of inlet section 202 below maximum temperature value 750. In this regard, cycling SOV 302 may comprise repeatedly opening and closing SOV 302 for predetermined durations.

Figure 9:
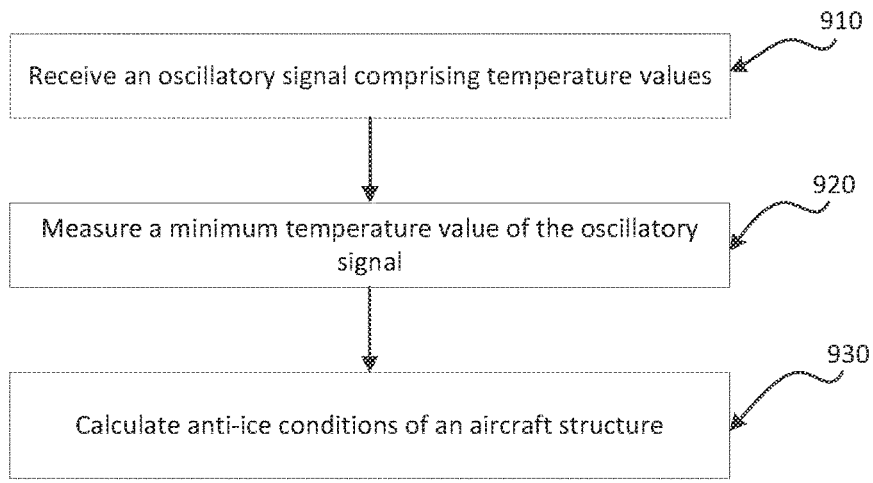
FIG. 9 illustrates a method for analyzing anti-ice performance, in accordance with various embodiments.

With reference to FIG. 9, a method 900 for analyzing anti-ice performance is illustrated, in accordance with various embodiments. Method 900 may include receiving an oscillatory signal comprising temperature values (step 910). Method 900 may include measuring a minimum temperature value of the oscillatory signal (step 920). Method 900 may include calculating anti-ice conditions of an aircraft structure (step 930).

With combined reference to FIG. 3 and FIG. 9, step 910 may include receiving, by controller 300, first signal 720. Step 910 may include receiving, by controller 300, second signal 730. Step 920 may include measuring, by controller 300, minimum temperature value 740 of first signal 720. Step 930 may include calculating anti-ice conditions of inlet section 202 using a constant value comprising the minimum temperature value 740. Step 930 may include calculating anti-ice conditions, for example, runback ice thickness, as a steady state analysis. Although described with respect to controller 300, method 900 may be performed by any suitable controller or processor.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for anti-ice performance analysis, comprising:
    cycling a flow of heating air through an aircraft structure, wherein the cycling comprises opening a valve for a first duration and closing the valve for a second duration, the first duration and the second duration are configured to maintain the temperature of the aircraft structure above a minimum threshold and below a maximum threshold;
    measuring a temperature of the aircraft structure to generate an oscillatory signal;
    measuring a minimum temperature value of the aircraft structure based on the oscillatory signal; and
    calculating, by a controller, a maximum runback ice thickness of the aircraft structure based on the minimum temperature value,
    wherein calculating the maximum runback ice thickness includes using the minimum temperature value as a constant value signal for simplifying the calculation as a steady state calculation.

2. The method of claim 1, further comprising determining the first duration for the valve to be open.

3. The method of claim 2, further comprising determining the second duration for the valve to be closed.

4. The method of claim 1, wherein the temperature is measured at a location corresponding to a coldest location of the aircraft structure.

5. The method of claim 1, further comprising measuring a second temperature at a location corresponding to a hottest location of the aircraft structure.

6. A method for analyzing anti-ice performance of a nacelle inlet, comprising:
    cycling a flow of heating air through a cavity defined by a lip of the nacelle inlet, wherein the cycling comprises repeatedly opening and closing a valve;
    measuring a temperature of the nacelle inlet to generate an oscillatory signal;
    measuring a minimum temperature value of the nacelle inlet using the oscillatory signal; and
    calculating, by a controller, a runback ice thickness of the nacelle inlet using the minimum temperature value as a constant value signal for simplifying the calculation as a steady state calculation.

7. The method of claim 6, wherein the temperature of the nacelle inlet increases in response to the valve being opened and the temperature of the nacelle inlet decreases in response to the valve being closed.

8. The method of claim 7, further comprising determining a first duration for the valve to be open.

9. The method of claim 8, further comprising determining a second duration for the valve to be closed.

10. The method of claim 6, wherein the flow of heating air is routed around a circumference of the nacelle inlet.

11. The method of claim 10, wherein the temperature is measured at a location corresponding to a coldest location of the nacelle inlet.

12. The method of claim 10, further comprising measuring a second temperature at a location where the flow of heating air first impinges on the nacelle inlet.

13. An article of manufacture, comprising:
    a controller; and
    a tangible, non-transitory memory configured to communicate with the controller, the tangible, non-transitory memory having instructions stored thereon that, in response to execution by the controller, cause the controller to perform operations, comprising:
    receiving, by the controller, an oscillatory signal comprising temperature values;
    measuring, by the controller, a minimum temperature value of an aircraft structure based on the oscillatory signal;
    calculating, by the controller, a maximum runback ice thickness of the aircraft structure based on the minimum temperature value,
    wherein calculating the maximum runback ice thickness includes using the minimum temperature value as a constant value signal for simplifying the calculation as a steady state calculation,
    sending, by the controller, a control signal to a valve, wherein the control signal causes the valve to open for a first duration; and
    sending, by the controller, a second signal to the valve, wherein the second signal causes the valve to close for a second duration.

14. The article of manufacture of claim 13, wherein the instructions cause the controller to perform operations further comprising determining the first duration for supplying heating air to the aircraft structure.

15. The article of manufacture of claim 13, wherein the instructions cause the controller to perform operations further comprising determining the second duration for supplying heating air to the aircraft structure.

16. The method of claim 3, wherein the first duration and the second duration are determined based upon the calculation of the maximum runback ice thickness for forming a predetermined heating air cycle profile for the aircraft structure.

17. The method of claim 9, wherein the first duration and the second duration are determined based upon the calculation of the maximum runback ice thickness for forming a predetermined heating air cycle profile for the aircraft structure.

18. The article of manufacture of claim 15, wherein the first duration and the second duration are determined based upon the calculation of the maximum runback ice thickness for forming a predetermined heating air cycle profile for the aircraft structure.

* * * * *